United States Patent [19]
Wada et al.

[11] Patent Number: 5,351,565
[45] Date of Patent: Oct. 4, 1994

[54] ENGINE STARTER

[75] Inventors: Minoru Wada; Yoshiaki Tanaka; Hiroshi Katoh; Hiroshi Taguchi, all of Tokyo, Japan

[73] Assignee: Komatsu Zenoah Kabushiki Kaisha, Tokyo, Japan

[21] Appl. No.: 120,842

[22] Filed: Sep. 13, 1993

Related U.S. Application Data

[63] Continuation of Ser. No. 915,014, Jul. 16, 1992, abandoned, which is a continuation of Ser. No. 391,506, Nov. 10, 1989, Pat. No. 5,159,845.

[30] Foreign Application Priority Data

Nov. 27, 1987 [JP] Japan .................. 62-179758
Nov. 27, 1987 [JP] Japan .................. 62-179759

[51] Int. Cl.⁵ ............................................. F02N 15/02
[52] U.S. Cl. ................................. 74/6; 74/7 C; 192/42
[58] Field of Search ............... 74/6, 7 R, 7 C, 7 E; 192/42, 45, 48.3, 105 R

[56] References Cited

U.S. PATENT DOCUMENTS

| | | | |
|---|---|---|---|
| 1,215,568 | 2/1917 | Mills | 123/179.25 X |
| 1,753,825 | 4/1930 | Ford | 123/179.22 X |
| 1,916,173 | 6/1933 | Lansing | 74/7 C |
| 1,975,047 | 9/1934 | Lansing | 74/7 C |
| 1,983,250 | 12/1934 | Tibbetts | 192/48.3 |
| 2,865,358 | 12/1958 | Musgrave | 123/174.26 |
| 2,939,448 | 6/1960 | Hansen | 123/179.24 |
| 3,696,593 | 10/1972 | Thorud et al. | 56/17.6 |
| 4,135,068 | 1/1979 | Burns | 200/61.85 |
| 4,566,567 | 1/1986 | Miyatake | 192/45 |
| 4,727,828 | 3/1986 | Ueno et al. | 123/2 |
| 4,770,279 | 9/1988 | Shiozaki et al. | 192/45 |
| 4,771,148 | 9/1988 | Bersonnet | 200/61.58 R |
| 4,821,691 | 4/1989 | Ueno et al. | 123/185.3 |
| 4,887,476 | 12/1989 | Yokoyama | 74/7 E |
| 4,895,234 | 1/1990 | Fujino | 74/7 C |
| 4,922,868 | 5/1990 | Ohkanda | 142/42 X |
| 4,989,705 | 2/1991 | Kashio et al. | 192/45 |
| 5,010,858 | 4/1991 | Schierling et al. | 74/7 L |

FOREIGN PATENT DOCUMENTS

| | | | |
|---|---|---|---|
| 435793 | 1/1912 | France | 192/42 |
| 2563689 | 11/1985 | France | |

Primary Examiner—Allan D. Herrmann
Assistant Examiner—David W. Laub
Attorney, Agent, or Firm—Weiser & Associates

[57] ABSTRACT

In an engine used for a portable working apparatus such as a brush cutter, there are arranged a drive gear rotated by a starter motor, and a driven gear engaging with the drive gear and connected to a crankshaft through a nonreturn clutch. The driven gear is fixed to the crankshaft until the starter motor starts the engine and released from the crankshaft after the start of the engine and after a rotational speed of the crankshaft exceeds that of the starter motor.

17 Claims, 8 Drawing Sheets

# ENGINE STARTER

This application is a continuation, of application Ser. No. 07/915,014 filed Jul. 16, 1992 now abandoned which is a continuation of Ser. No. 391,506 filed Nov. 10, 1989 now U.S. Pat. No. 5,159,845.

TECHNICAL FIELD

The present invention relates to an engine starter using a motor for starting a small-sized engine adopted for a portable working machine such as a brush cutter.

BACKGROUND ART

Figure 4:
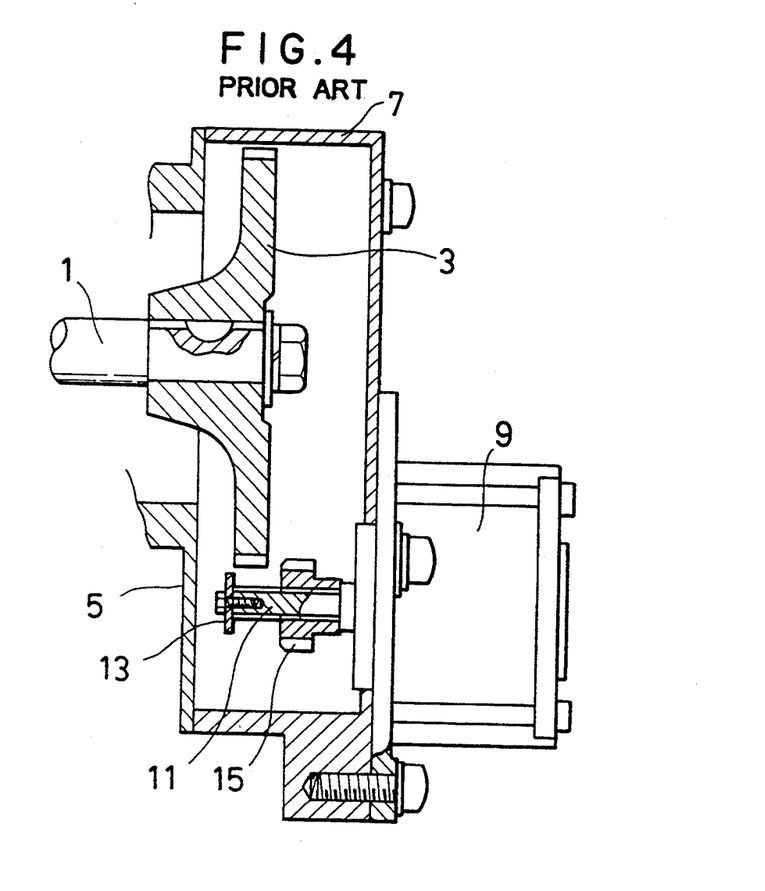
FIG. 4 is a sectional side view showing a prior art example.

FIG. 4 shows a conventional starter which uses a motor for starting an engine. In the figure, a crankshaft 1 is provided with a fixed driven gear 3. The driven gear 3 is covered with a gear case 7 fixed to a crank case 5. A starter motor 9 is fitted to the gear case 7. The starter motor 9 has a rotary shaft 11 whose periphery is threaded to provide a screw portion 13 on which a drive gear 15 is movably fitted. The drive gear 15 removably engages with the driven gear 3.

When the starter motor 9 is actuated, the drive gear 15 tries to be stationary due to its inertia so that the drive gear 15 rotates relative to the rotary shaft 11. As a result, the drive gear 15 axially moves due to the screw portion 13 and engages with the driven gear 3 to rotate the crankshaft 1 to start the engine.

After the engine is started, a circumferential speed of the driven gear 3 exceeds that of the rotary shaft 11 so that the drive gear 15 rotates reversely relative to the rotary shaft 11. As a result, the drive gear 15 separates from the driven gear 3 and returns to its original position due to the screw portion 13.

According to this conventional arrangement, the mechanism for axially moving the drive gear 15 is complicated, and the gears may be injured due to shocks caused by the moving drive gear 15. Further, the driven gear 3 of large inertia fixed to the crankshaft 1 shall always be rotated together with the engine so that the crankshaft and bearings shall have sufficient strength. In addition, the rotary shaft of the starter motor and the gears tend to be injured because the driven gear 3 of large inertia is suddenly rotated by the engagement with the drive gear 15.

DISCLOSURE OF INVENTION

According to the present invention, a driven gear is journaled to a engine crankshaft through a nonreturn clutch. The driven gear is covered by a gear case which is fixed to a crankcase. A starter motor is fitted to the gear case, and a rotary shaft of the starter motor is fixedly connected with a drive gear which is always engaging with the driven gear. When started, a rotational speed of the driven gear, etc., increases gradually as a rotational speed of the starter motor increases, so that no shock may be applied to the gears and bearings which, therefore, do not wear easily. When the rotational speed of the crankshaft exceeds that of the driven gear, the crankshaft rotates in a opposite direction relative to a rotational direction of the driven gear so that the nonreturn clutch is released. By stopping the starter motor after the actuation of the engine, the driven gear stops while the crankshaft is rotating, so that the driven gear of large inertia never rotates at high speed.

BEST MODE FOR CARRYING OUT THE INVENTION

An embodiment of the present invention will now be explained in detail with reference to the drawings.

Figures 1, 2:
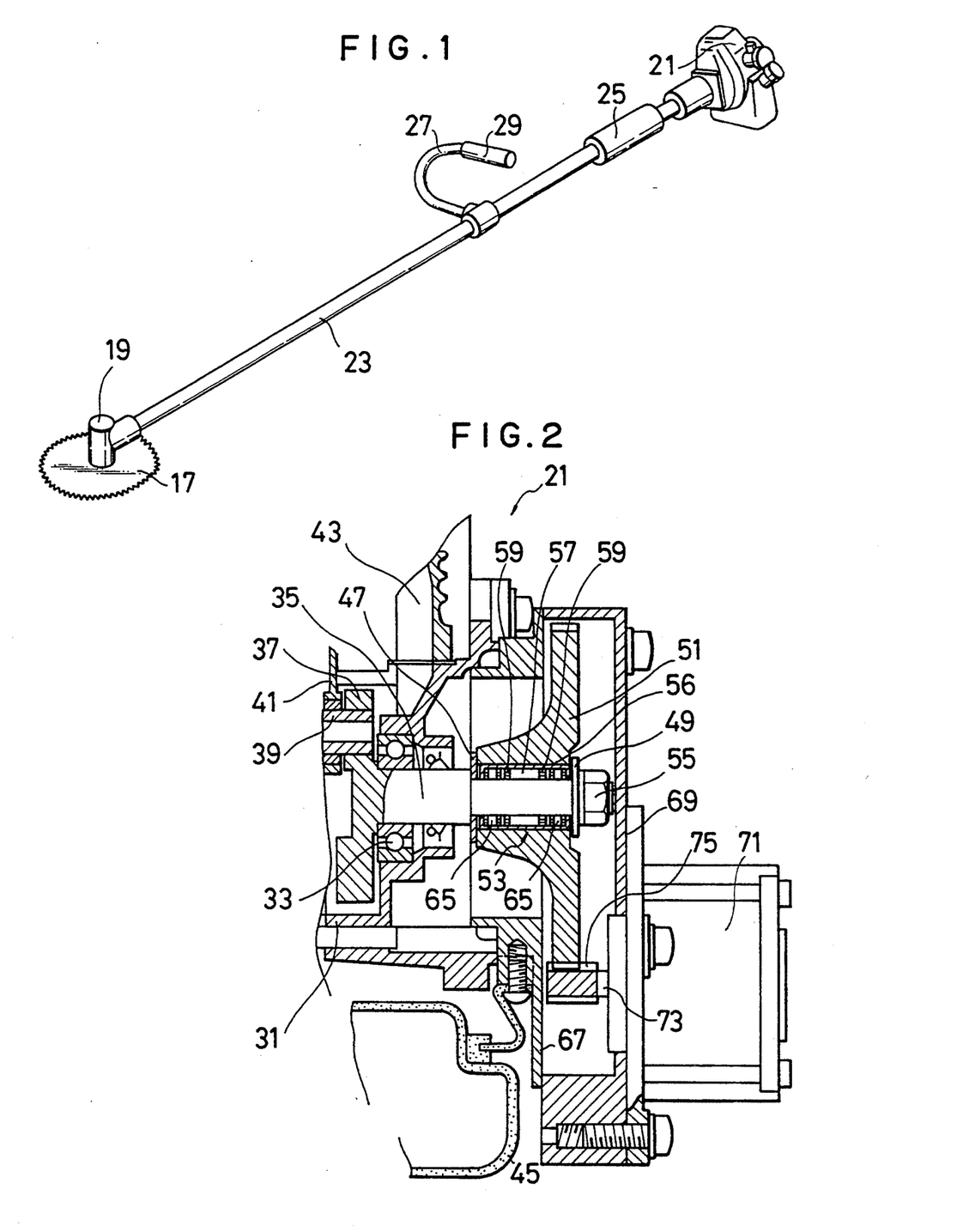
FIG. 1 is a perspective view showing a brush cutter according to the present invention.
FIG. 2 is a sectional side view showing a first embodiment of the present invention.
Figure 3:
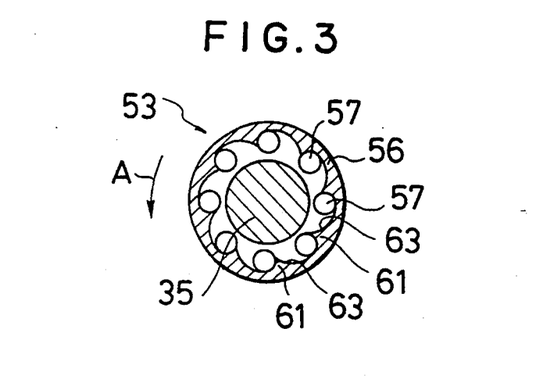
FIG. 3 is a sectional front view showing essential part.

FIG. 1 shows a brush cutter provided with an apparatus according to the present invention. A bearing member 19 for supporting a rotary blade 17 is connected with an engine 21 with a connection pipe 23 through which a transmission shaft (not shown) extends. A grip portion 25 and a handle 27 are fixed to the connection pipe 23, and an end of the handle 27 is provided with a grip portion 29. FIGS. 2 and 3 show the details of the engine 21. A crankcase 31 supports a crankshaft 35 through a bearing 33. A crank arm 37 of the crankshaft 35 is fitted to an end of a connecting rod 41 with a crankpin 39. The other end of the connecting rod 41 is connected to a piston (not shown) which slidably engages with a cylinder 43 fixed to the top of the crankcase 31. A lower part of the crankcase 31 is provided with a fuel tank 45. At one end of the crankshaft 35, a driven gear 51 is supported between washers 47 and 49 with a gap between the crankshaft and the drive gear, and positioned by a nut 55. A nonreturn clutch 53 is disposed between the crankshaft 35 and the driven gear 51. The nonreturn clutch 53 comprises a cylindrical case 56 fixedly inserted into an inner bore of the driven gear 51, and a plurality of rollers 57 that are disposed in the cylindrical case 56 at predetermined intervals between holding rings 59. The cylindrical case 56 is provided with projections 61 that are projectingly formed on the inner surface of the cylindrical case 56. In a relative rotation of the crankshaft 35 and the cylindrical case 56 so as to roll the rollers toward slant surfaces 63 formed on one sides of the projections 61, the rollers 57 come on the slant surfaces 63 and are forcibly jammed between the crankshaft 35 and the cylindrical case 56, thus stopping the relative motion of the crankshaft 35 and the cylindrical case 56. In the reverse relative rotation, the rollers 57 separate from the slant surfaces 63 so that the cylindrical case 56 become free from the crankshaft 35. On both sides of the rollers 57, there are arranged bearing rollers 65 engaging with a round inner surface of the cylindrical case 56 to support the crankshaft 35. A gear case 69 for covering the driven gear 51 is fixed to a flange portion 67 of the crankcase 31. A starter motor 71 is fixed to the gear case 69. A drive gear 75 fixed to a rotary shaft 73 of the starter motor 71 is always engaging with the driven gear 51.

With the above-mentioned arrangement, when the starter motor 71 is driven, the driven gear 51 is rotated via the drive gear 75 to rotate the cylindrical case 56 of the clutch 53 in the direction of an arrow A shown in FIG. 3. As a result, the crankshaft 35 rotates reversely relative to the cylindrical case 56 so that the rollers 57 roll around the periphery of the crankshaft 35 along the slant surfaces 63 and are forcibly jammed between the slant surfaces 63 and the crankshaft 35. Then, the crankshaft 35 rotates together with the driven gear 51 via the rollers 57 to start the engine 29. After the engine 29 is started, a rotational speed of the crankshaft 35 exceeds that of the driven gear 51 so that the cylindrical case 56 may rotate relative to the crankshaft 35 in a direction opposite to the direction of the arrow A. Therefore, the rollers 57 separate from the crankshaft 35 to be free. If the starter motor 71 is stopped, the driven gear 51 is also stopped so that only the crankshaft 35 rotates.

According to the present invention, the engine starter has a simple construction and be produced at low cost. Since the gears engage with each other with no shocks at the time of starting the engine, the gears do not wear easily to prevent bearings of the starter motor from being injured. The driven gear of large inertia will be stopped after the start of the engine so that injuries on the crankshaft and bearings may be reduced.

The nonreturn clutch of the present invention is not limited to the one mentioned in the above using the rollers. For instance, a ratchet, etc., may be used so that the driven gear and the crankshaft may turn relative to each other in one direction freely to block torque transmission, while they may turn together with no relative rotation in the other direction.

As in case of the embodiment mentioned in the above, if the starter motor, drive gear and driven gear are disposed on the crankshaft on the opposite side of a centrifugal clutch for transmitting torque, the engine may be connected directly to a casing of a working machine such as a pump and a blowing cleaner, because the starter motor is disposed on the opposite side of the centrifugal clutch not to interfere with It. Therefore, the working machine as a whole may be made compact.

In this case, instead of providing the nonreturn clutch between the crankshaft and the driven gear to disable relative rotation in one direction, the driven gear may be fixed to the crankshaft (no rotation in both directions) to engage only in one direction with a spin-out type drive gear. Further, a recoil starter may be arranged on the outer side of the driven gear to realize both an electric and a manual starting operations.

Figure 5:
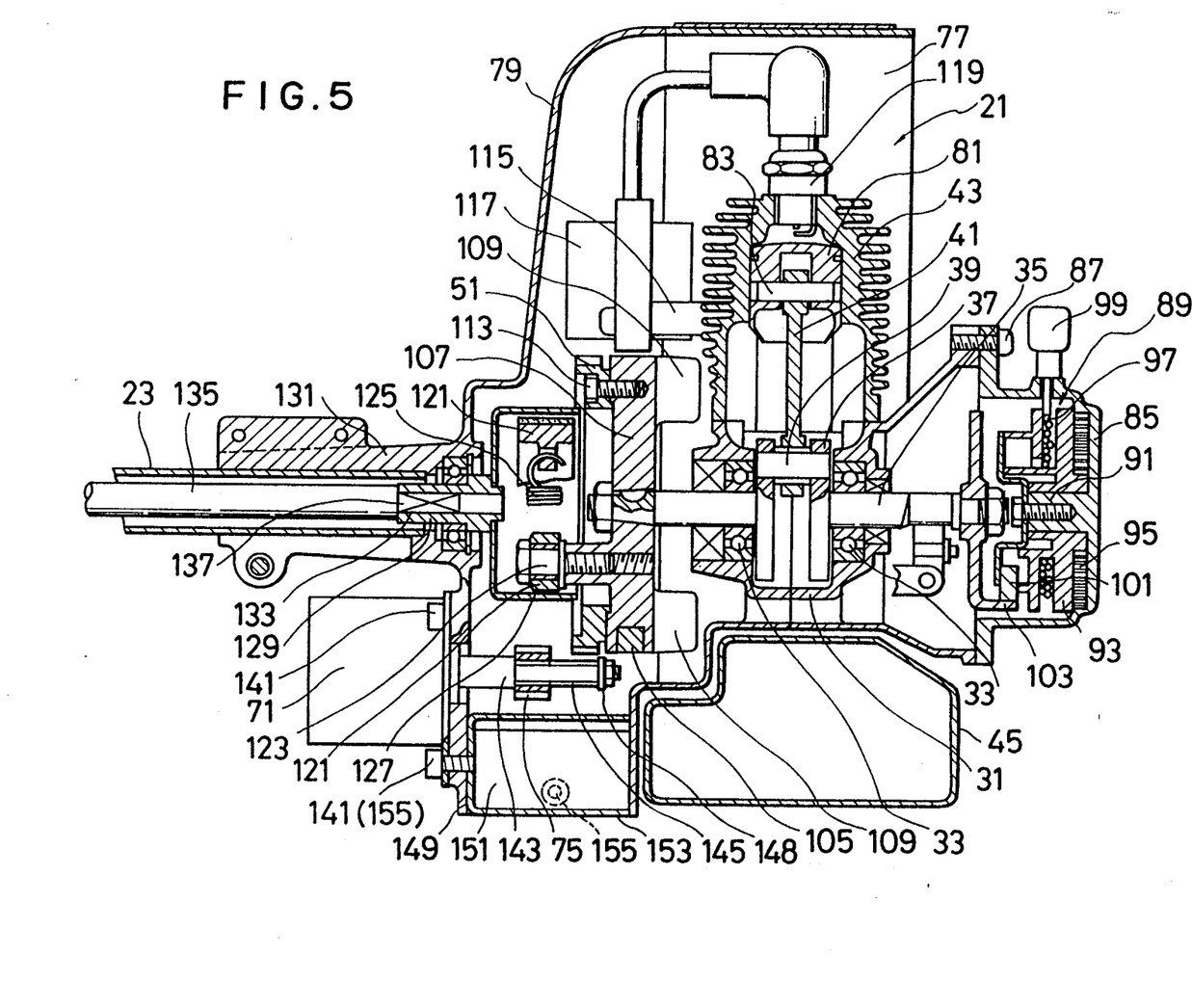
FIG. 5 a sectional side view showing an engine provided with a recoil starter according to another embodiment of the present invention.

FIG. 5 shows an embodiment in which a starter motor is provided with a recoil starter. In the figure, an engine 21 comprises a crankcase 31 and a cylinder 43. A cylinder cover 77 covering the side and upper faces of the cylinder 43 is fixed to the crankcase 31. A fan cover 79 is fixed to cover all the faces of the crankcase 31 and cylinder cover 77. A fuel tank 45 is fitted to a lower surface of the crankcase 31. In the crankcase 31, a crankshaft 35 is horizontally supported by bearings 33. A crank arm 37 of the crankshaft 35 is connected to a lower end of a connecting rod 41 with a crankpin 39. An upper end of the connecting rod 41 is connected to a piston 81 through a piston pin 83. The piston is slidable in the cylinder 43.

A recoil starter 85 is provided in a recoil case 85 fixed to the back of the crankcase 31 with screws 87. A fixed shaft 91 of the recoil starter 85 is projectingly disposed on the same axis as that of the crankshaft 35. A reel 93 is rotatably arranged on the fixed shaft 91. A coil spring 95 is disposed between the reel 93 and the recoil case 85, and both ends of the coil spring 95 are supported by the reel 93 and the recoil case 85, respectively. An end of a traction cord 97 is wound around the reel 93. The other end of the traction cord 97 passes through the recoil case 85 and is provided with a starter handle 99. In front of the reel 93, there is disposed a claw clutch 101 which advances or retracts according to centrifugal force such that the claw clutch 101 removably engages in one direction with a stopper 103 fixed to the rear end of the crankshaft 35.

A front end of the crankshaft 35 is provided with a magnet wheel 107 having a magnet embedded in a portion of the periphery of the magnet wheel 107. On the back of the magnet wheel 107, there are disposed fans 109. On the front surface of the magnet wheel 107, a driven gear 51 is fixed with a plurality of screws 113. A stay 115 is fixed to the front side of the cylinder 43, and a induction coil 117 is fitted to the stay 115. The induction coil 117 is responsive to the magnet 105 to generate electricity which is discharged from an ignition plug 119 arranged at the top of the cylinder 43. On the front surface of the magnet wheel 107, two clutch shoes 121 facing each other are pivotably supported by step bolts 123 and pulled to each other by a spring 125. A clutch drum 127 is arranged in the vicinity of the peripheries of the clutch shoes 121. A boss shaft 129 of the clutch drum 127 is supported by a bearing portion 131 of the fan cover 79. In the boss shaft 129, there is formed a square hole 133 which engages with a square shaft 137. The square shaft 137 is located at a rear end of a transmission shaft 135 for driving a rotary blade 17.

A starter motor 71 is fixed to a lower front surface of the fan cover 79 with three screws 141. A rotary shaft 143 of the starter motor 71 passed through the front surface of the fan cover 79 and has a thread 145 engaging with a small gear 147. When the starter motor 71 is driven, the small gear 147 pushes forward a drive gear 75 which is stationary due to its inertia and presses the same against a stopper 148 disposed at an end of the rotary shaft 143. Then, the drive gear 75 engages with the driven gear 51 to drive the driven gear 51. After the engine 21 is started, a rotational speed of the driven gear 51 increases so that the drive gear 75 rotates relative to the rotary shaft 143 in the opposite direction. Therefore, the drive gear 75 retracts and separates from the driven gear 51. Into an opening portion 149 formed at a lower surface of the fan cover 79, a battery case 153 for storing a battery 151 is inserted and fixed with screws 155 provided at three positions on the front and side surfaces.

To start the engine 21 of this embodiment, a push-button starter switch (not shown) disposed at a proper position is pushed down to rotate the starter motor 71 with a current flowing from the battery 151. Then, the drive gear 75 moves to the right of FIG. 5 due to the thread 145 to engage with the driven gear 51 and start the engine 21. As a rotational speed of the engine 21 increases, the clutch shoes 121 engage with the clutch drum 127 due to centrifugal force to rotate the rotary blade 17 via the transmission shaft 135. A worker uses a shoulder band to hang the brush cutter from his shoulder and grasps grip portions 25 and 29 with his hands to cut weeds, etc., on the ground with the rotary blade 17. While the engine 21 is rotating, a generator (not shown) responsive to the magnet 105 may charge the battery 151. If the battery 151 is not sufficiently charged or if the starter motor 71 is out of order, the screws 141 will be unfastened to take out the starter motor 71 or the battery 151 to repair or charge them. Meanwhile, the engine 21 may be started with the recoil starter 89 to continue the cutting work normally. Namely, the starter handle 99 is pulled with a hand to rotate the reel 93 against the force of the coil spring 95 to advance the craw clutch 101, which engages with the stopper 103 to rotate the crankshaft 35 and start the engine 21. After the engine 21 is started the claw clutch 101 rotates reversely relative to the stopper 103 so that the stopping state is released. By releasing the starter handle 99, the reel 93 rotates reversely due to the coil spring 95 to pull the traction cord 97, while the claw clutch 101 separates from the stopper 103.

Therefore, the starter motor and the battery can easily be removed, and, due to the provision of the recoil starter, the cutting work can be carried out during the repair of the starter motor or the charge of the battery to prevent the work efficiency from deteriorating.

Figures 6, 7:
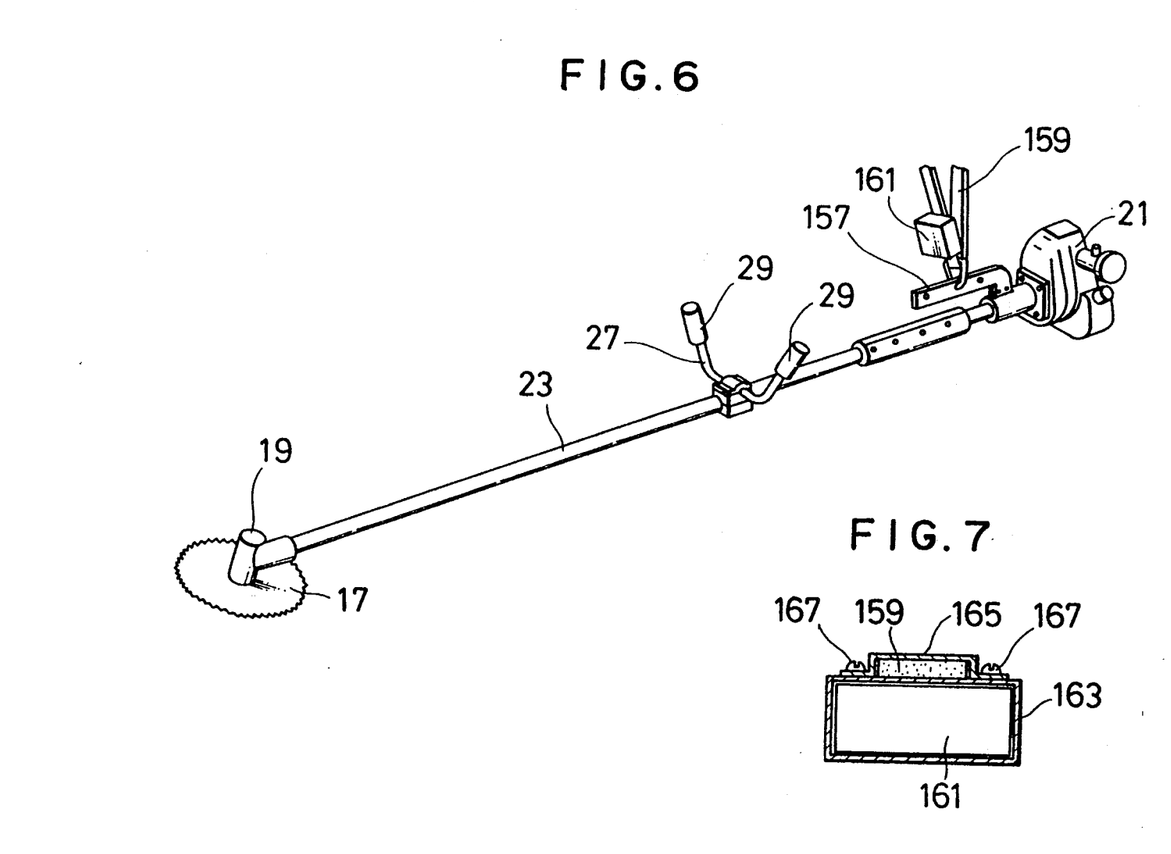
FIG. 6 is a perspective view showing a brush cutter provided with a battery disposed on a shoulder band.
FIG. 7 is a sectional plan view showing the battery.

FIGS. 6 and 7 show an embodiment in which a battery is fitted to a shoulder band. In front of the engine 21, there is disposed a bracket 157 to which a lower end of a shoulder band 159 is fitted. A battery case 163 for receiving a battery 161 is fitted to the shoulder band 159 with a fixture 165 and screws 167.

An operator may hang the shoulder band 159 on his shoulder and grasp the grip portions 29 with his hands to cut weeds, etc., on the ground with the rotary blade 17. Since the battery 161 is directly fitted to the shoulder band 159, the weight of the battery may not cause unbalance.

Figures 8, 9:
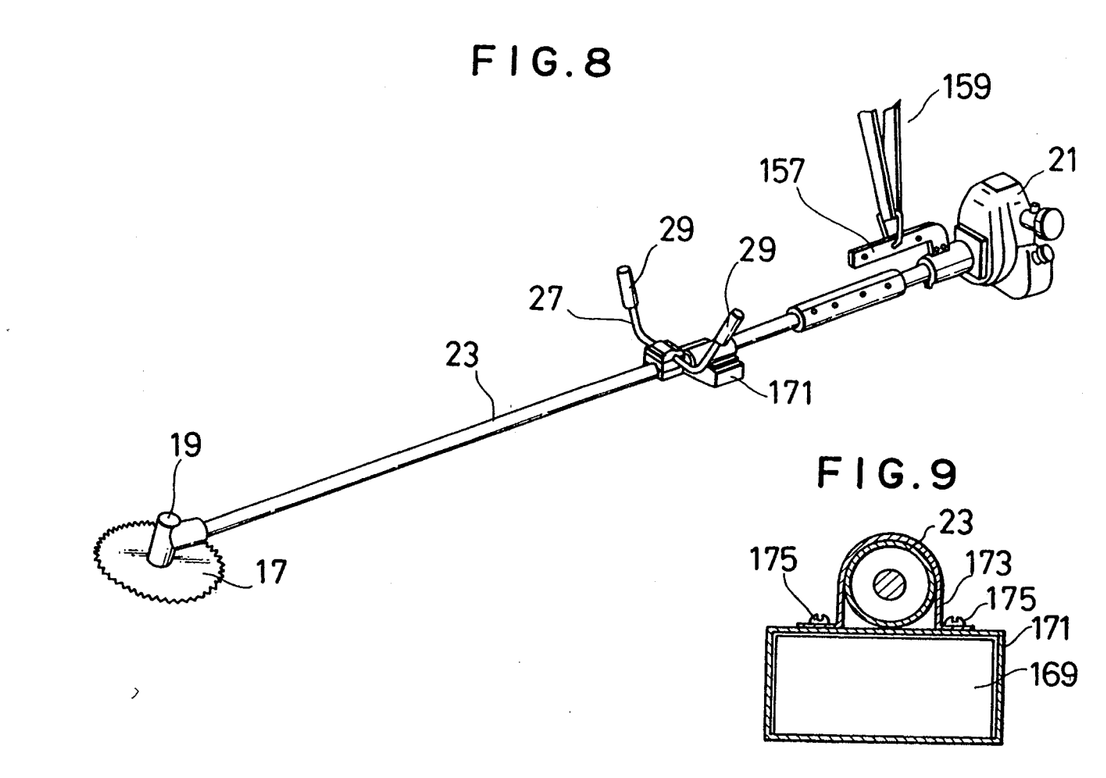
FIG. 8 is a perspective view showing a brush cutter provided with a battery position adjustably disposed on a connection pipe.
FIG. 9 is a sectional front view showing the battery.

FIGS. 8 and 9 show an embodiment in which a battery is adjustably positioned on the connection pipe. A case 171 for receiving a battery 169 is fitted to the connection pipe 23 with a fixture 173 and screws 175 such that a position of the battery 169 is adjustable.

An operator may hang the shoulder band 159 on his shoulder and grasps the grip portions 29 with this hands to cut weeds, etc., on the ground with the rotary blade 17. The battery 169 may be positioned at, for instance, the center of gravity of the brush cutter such that the weight of the battery may not cause unbalance.

FIGS. 10 to 13 show an embodiment in which batteries are fitted to the connection pipe with a plurality of fixtures arranged at proper intervals. An annular handle 181 is fixed to the connection pipe 23 with a fixture 179 and bolts 177. A grip portion 183 is formed at upper central part of the handle 181. Behind the handle 181, a fixture 187 is fixed to the connection pipe 23 with a bolt 189. To the fixture 187, a suspension ring 185 fitted to a lower end of a shoulder band 183 is fitted. A plurality of batteries 191 are received in a cylindrical case 193 in a longitudinal direction. Each end of the case 193 is supported by a supporting portion 195 of the fixture 179 and by a supporting portion 201 of a fixture 199 which is fixed to the connection pipe 23 with a bolt 197. A central portion of the case 193 is supported by the fixture 187.

Figure 10:
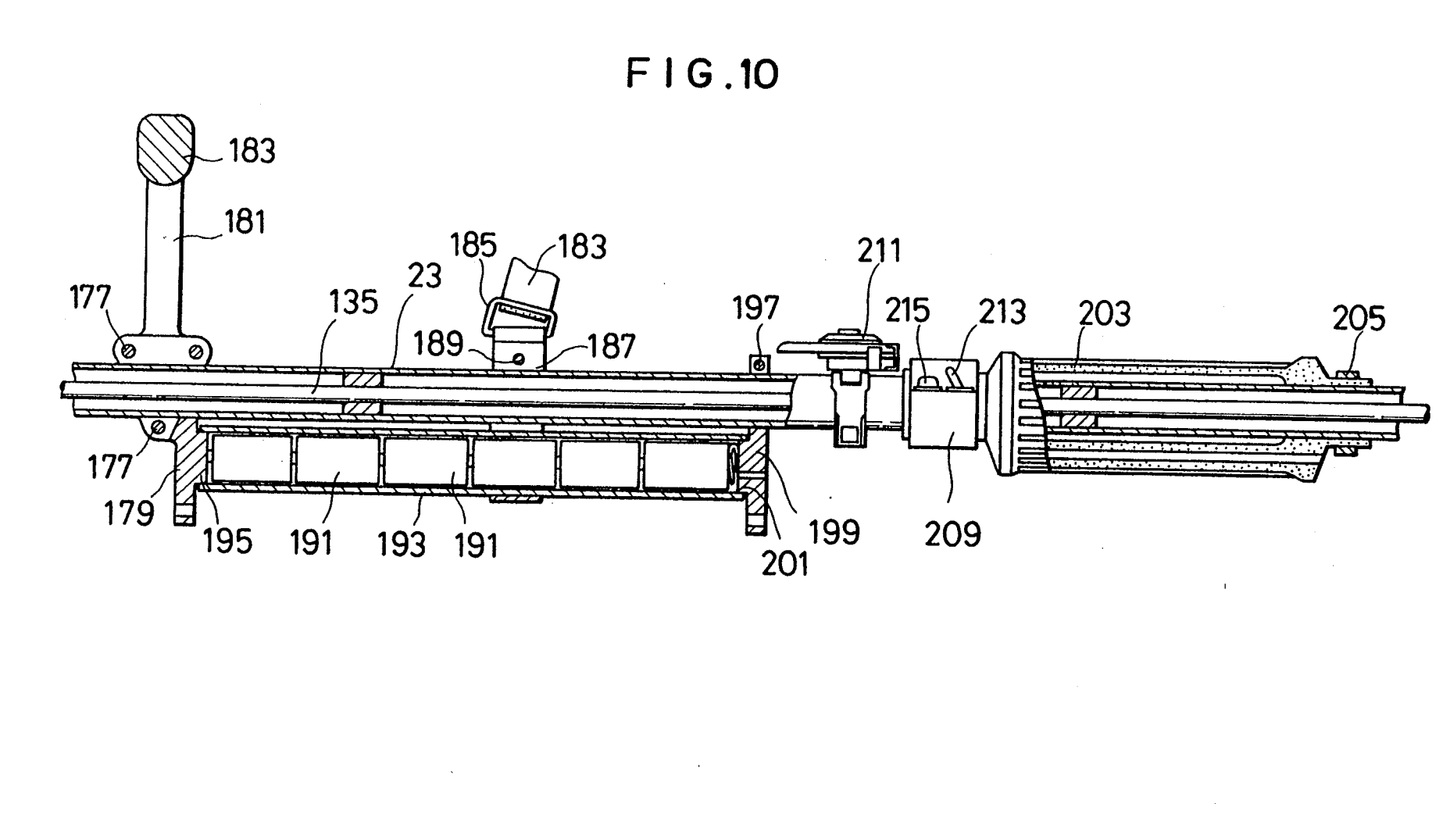
FIG. 10 is a sectional side view showing a battery portion fitted to a connection pipe with a plurality of fixtures.
Figure 11:
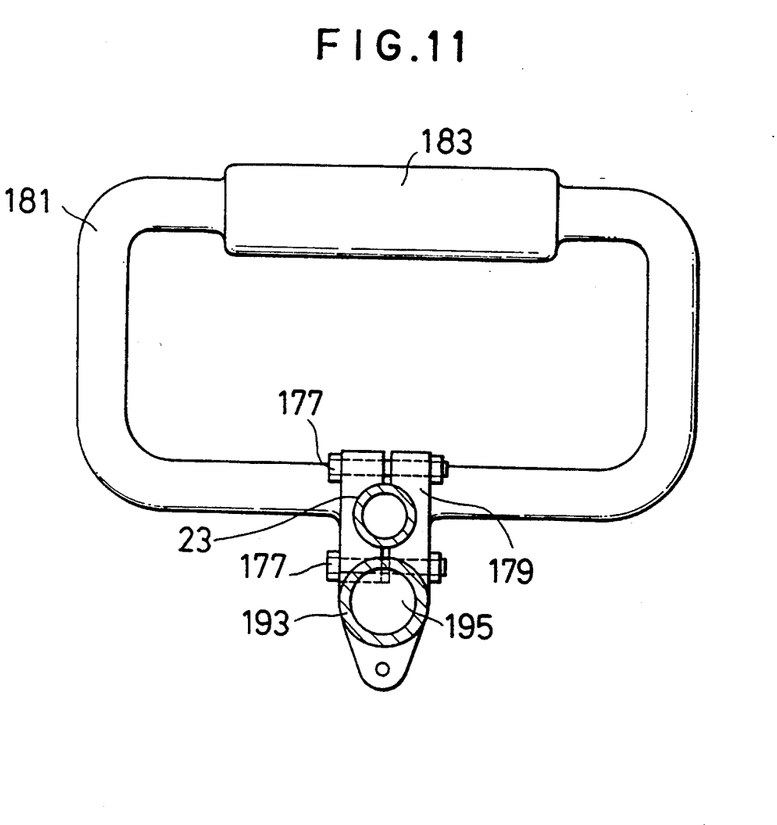
FIGS. 11 to 14 are front views showing the fixtures, respectively.
Figure 12:
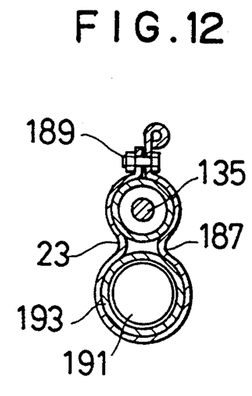
Figure 13:
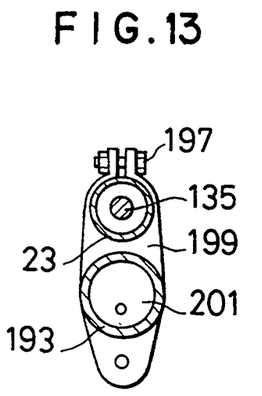
Figure 14:
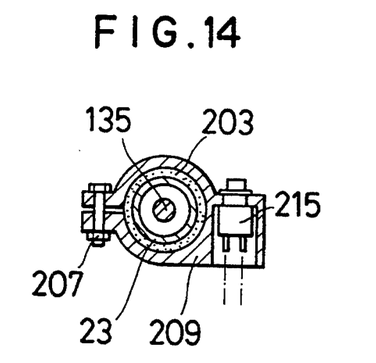

Behind the fixture 199, a grip portion 203 made of elastic material is fixed to the connection pipe 23. The periphery of a rear end of the grip portion 203 is fastened with a fixture 205, while the periphery of a front end thereof is fastened with a fixture 209 which is tightened with a bolt 207. Between the fixtures 209 and 199, there is arranged a throttle lever 211. The fixture 209 is provided with a power source switch 213 and a push-button starter switch 215.

The batteries 191 may be positioned at the center of gravity of the brush cutter such that the weight of the batteries may not cause unbalance.

Since the starter motor switch 215 is arranged on the fixture 209 in this embodiment, vibrations of the engine, etc., may be absorbed by the elastic material of the grip portion so that the starter switch may not be damaged and not cause contact errors. The fixture of the starter switch is used for the fixture of the grip portion so that separate fixtures and vibration dampers are not needed. Therefore, the structure is simplified, the number of parts reduced, the apparatus easily assembled.

FIGS. 15 to 20 show an embodiment in which a push-button switch for a starter motor and a changeover switch for an ignition circuit are relatively operated. A case 221 comprises side plates 217 and bottom plate 219. A fitting plate 223 has front and rear edges bent downwardly. The fitting plate 223 is provided with brackets 225 which are arranged at front and rear positions on both sides of the fitting plate 223. The brackets 225 are fixed to the side plates 217 with screws 227. The fitting plate 223 has two fitting holes 229 and 231 into which a push-button switch 233 and a changeover switch 235 are inserted, respectively. The switches 233 and 235 are fastened with nuts 237 and 239, respectively. The push-button switch 233 connects and disconnects an electric circuit of the starter motor 71 of the engine. By pushing down a returnable operation segment 241, the starter motor is connected to the battery to rotate the crankshaft and start the engine. The changeover switch 235 has an operation segment 243 which is pivotable back and forth. By pivoting the operation segment 243 backwardly, the ignition circuit is connected, and, by pivoting the operation segment 243 forwardly, the ignition circuit is disconnected to prevent ignition. A horizontal plate 245 is disposed above the fitting plate 223. The horizontal plate 245 has projections 247, 249, 251 and 253 which engage with horizontal long holes 255, 257, 259 and 261 which are formed on the side plates 217 at front and rear portions of the side plates. Therefore, the horizontal plate 245 is movable back and forth. The front long holes 255 and 257 have notch portions 263 and 265 extending downwardly from the rear edges of the long holes, respectively. By moving the horizontal plate 245 rearwardly, the projections 247 and 249 are positioned at the notch portions 263 and 265 so that the horizontal plate 245 may downwardly pivotable around the rear projections 251 and 253. By moving the horizontal plate 245 forwardly, the front projections 247 and 249 are caught by the long holes 255 and 257 so that the horizontal plate 245 may not pivot. The horizontal plate 245 has a fitting hole 267 into which the operation segment 243 of the changeover switch 235 is inserted, and the operation segment 243 pivots as the horizontal plate 245 moves back and forth. The upper end of the operation segment 241 of the push-button switch 233 abuts against the lower surface of the horizontal plate 245. A cover 269 is fixed to the upper surface of the horizontal plate 245. A push button 271 protrudes from the upper surface of the cover 269.

Figure 15:
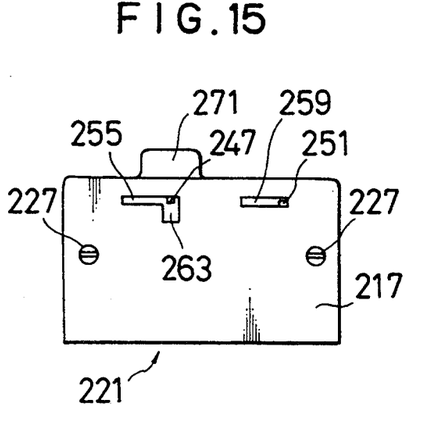
FIGS. 15 and 16 are a side view and a sectional side view, respectively, showing a switching device.
Figure 16:
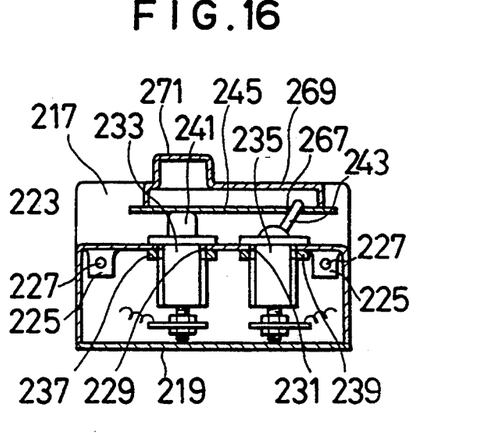
Figure 17:
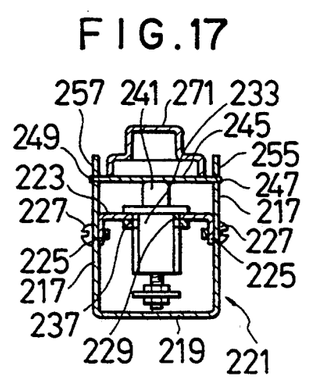
FIG. 17 is a sectional front view showing essential part of the switching device.
Figure 18:
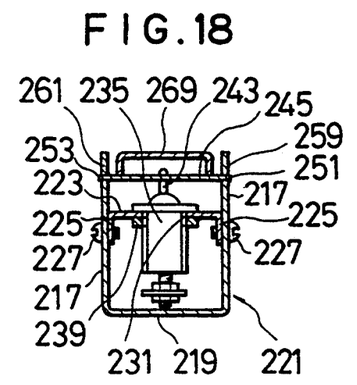
FIG. 18 is a sectional front view showing another essential part of the switching device.
Figure 19:
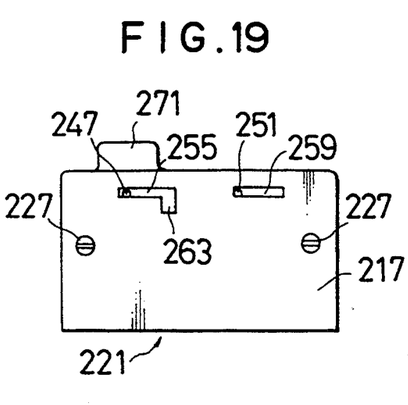
FIGS. 19 and 20 are a front view and a sectional front view, respectively, showing the switching device under another state.
Figure 20:
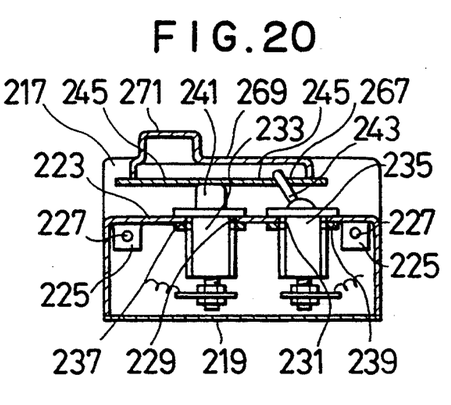

In the arrangement mentioned in the above, the push button 271 of the cover 269 is pushed backwardly with a finger to move the horizontal plate 245 backwardly. Then, as shown in FIGS. 15 and 16, the operation segment 243 of the changeover switch 235 is pivoted backwardly to connect the ignition circuit. Under this situation, the push button 271 is pushed down to turn the horizontal plate 245 around the rear projections 251 and 253 so that the front projections 247 and 249 may descend along the notch portions 263 and 265. As a result, the horizontal plate 245 pivots downwardly to push the operation segment 241 of push-button switch 233 downwardly. Accordingly, the starter motor is rotated to start the engine. If the finger is released from the push button 271, the operation segment 241 of the push-button switch 233 returns to an upper initial position due to the force of a spring (not shown), and the horizontal plate 245 also returns to an upper initial position. If the push button 271 is pressed forward as shown in FIGS. 19 and 20, the horizontal plate 245 makes the operation segment of the changeover switch 235 to pivot forwardly to disconnect the ignition circuit and stop the engine. At this position, the front projections 247 and 249 are caught by the long holes 255 and 257 so that the horizontal plate 245 may not pivot downwardly. Therefore, even if the push button 271 is touched with fingers, the push-button switch 233 never operates.

Therefore, even if the push-button switch is touched with the fingers, the engine never starts suddenly. Only with the changeover switch being under a contact state, the push button-switch is able to be pushed down so that there may not be ignition errors caused by operation mistakes. Further, these components can easily be formed through a metal press mold or with synthetic resin, and the switches may be commercially available ones to reduce the manufacturing cost.

As described in the above, the present invention provides an engine starter having a simple constitution which can be manufactured at low cost. Since the present invention causes no shocks on the engagement of gears at the start of engine so that the gears will not wear easily, and bearings of a starter motor will not be injured easily. After starting the engine, a driven gear of large inertia is stopped so that crankshaft, bearings, etc., may not be injured easily.

We claim:

1. An engine unit comprising:
an engine having a rotatable crankshaft;
a starter motor having a rotary shaft for supplying rotational power for rotating the crankshaft to start
a drive gear adapted for rotation by the rotational power supplied by the rotary shaft of the starter motor;
a driven gear including an inner bore and adapted for rotation relative to the crankshaft, and concentric with the crankshaft, wherein the driven gear is engaged with the drive gear for rotation responsive to rotation of the drive gear;
a case fixedly and coaxially fitted in the inner bore of the driven gear and surrounding the crankshaft; and
clutch means provided on the case, separably surrounding the crankshaft and biased for engagement with the crankshaft responsive to rotation of the driven gear, for connecting and disconnecting the crankshaft and the case so that when the starter motor is driven to start the engine, the crankshaft is connected to the driven gear, and so that after the engine is started, the crankshaft is fully disconnected from the clutch means and the driven gear so that only the crankshaft rotates.

2. The engine unit of claim 1, wherein the driven gear is journalled for rotation in either of two opposite directions relative to the crankshaft, and wherein the clutch means connects the crankshaft and the driven gear only when the driven gear rotates in a predetermined one of said two directions.

3. The engine unit of claim 2, wherein the clutch means comprises means for locking the crankshaft to the case, and means for operating the locking means to lock the crankshaft to the case when the driven gear rotates in the predetermined one of said two directions, and to prevent the locking means from operating when the crankshaft rotates relative to the driven gear in the predetermined one of said two directions.

4. The engine unit of claim 3, wherein the case has an inner bore, the locking means includes at least one roller which is receivable between the crankshaft and the inner bore of the case and the operating means comprises at least one slanting surface formed on the inner bore of the case so that when the driven gear rotates in the predetermined one of said two directions, the roller rolls upon the slanting surface until jammed between the crankshaft and the slanting surface, and so that when the crankshaft rotates relative to the driven gear in the predetermined one of said two directions, the roller rolls back and is released from the crankshaft.

5. The engine unit of claim 4, wherein the operating means further comprises a radial projection on the inner bore of the case having circumferentially opposing sides, and wherein the slanting surface is formed on one of the sides of the radial projection.

6. The engine unit of claim 1, wherein the engine unit further includes a crank case for enclosing the crankshaft and a gear case which is mounted on the crank case and which is fitted with the starter motor, wherein the crankshaft has opposing ends, wherein one end of the crankshaft and the rotary shaft of the starter motor extend into the gear case, and wherein the drive gear, the driven gear and the clutch means are positioned inside the gear case.

7. The engine unit of claim 17, further comprising a removable power source for operating the starter motor and a recoil starter for supplying rotational power for starting the engine unit, wherein the starter motor is removably fitted to the gear case.

8. The engine unit of claim 1, wherein the inner bore of the driven gear has a substantially cylindrical shape.

9. The engine unit of claim 1, wherein the case frictionally engages the inner bore of the driven gear.

10. An engine unit comprising:
an engine having an axial and rotatable crankshaft;
a starter motor for supplying rotational power for rotating the crankshaft to start the engine;
a driven gear adapted for rotation relative to the crankshaft and rotated by the rotational power supplied from the starter motor, wherein the driven gear includes an inner bore for coaxially receiving the crankshaft so that the crankshaft is centrally placed on the driven gear; and clutch means provided on the inner bore of the driven gear to surround the crankshaft, and biased for engagement with the crankshaft responsive to rotation of the driven gear, for connecting and disconnecting the crankshaft and the driven gear so that when the starter motor is driven to start the engine, the crankshaft is connected to the driven gear, and so that after the engine is started, the crankshaft is fully disconnected from the clutch means and the driven gear so that only the crankshaft rotates.

11. The engine unit of claim 8, wherein the clutch means connects the crankshaft and the driven gear only when the driven gear rotates in a predetermined one of two opposite rotational directions relative to the crankshaft.

12. The engine unit of claim 8, wherein the clutch means comprises:

at least one roller which is received in the inner bore; and at least one slanting surface which is provided on the inner bore of the driven gear so that when the driven gear rotates in a predetermined one of two opposite rotational directions, the roller rolls upon the slanting surface until jammed between the crankshaft and the slanting surface, and so that when the crankshaft rotates relative to the driven gear in the predetermined one of said two rotational directions, the roller rolls back and is released from the crankshaft.

13. The engine unit of claim 12, wherein the clutch means further comprises a cylindrical case fitted on the inner bore of the driven gear, and wherein said at least one slanting surface is formed inside the cylindrical case.

14. The engine unit of claim 13, wherein the clutch means further comprises a radial projection formed on an inner side of the cylindrical case, and wherein the slanting surface is formed on one of two circumferentially opposing sides of the radial projection.

15. The engine unit of claim 10, wherein the starter motor has a rotary shaft for supplying the rotational power, and the engine unit further comprises a drive gear which is adapted for rotation by the rotational power supplied by the rotary shaft, and wherein the driven gear is engaged with the drive gear for rotation responsive to rotation of the drive gear.

16. The engine unit of claim 15, wherein the engine unit further includes a crank case for enclosing the crankshaft and a gear case which is mounted on the crank case and which is fitted with the starter motor, wherein the crankshaft has opposing ends, wherein one end of the crankshaft and the rotary shaft of the starter motor extend into the gear case, and wherein the drive gear, the driven gear and the clutch means are positioned inside the gear case.

17. The engine unit of claim 16, further comprising a removable power source for operating the starter motor and a recoil starter for supplying the rotational power for starting the engine unit, wherein the starter motor is removably fitted to the gear case.

* * * * *